United States Patent Office 2,804,342
Patented Aug. 27, 1957

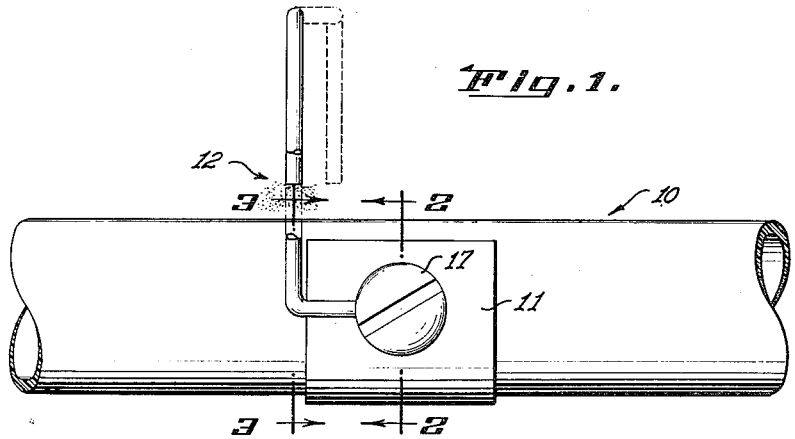
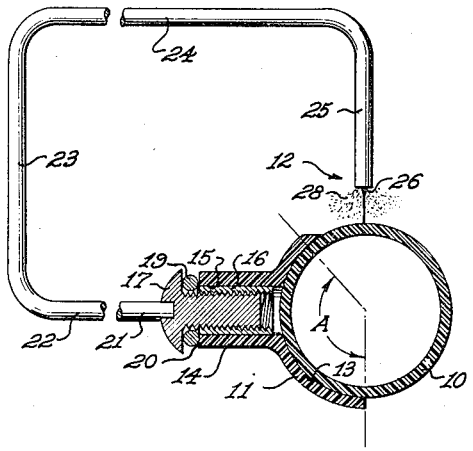
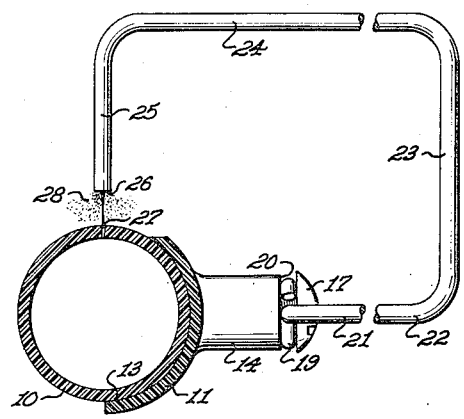
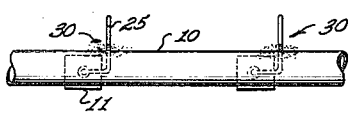
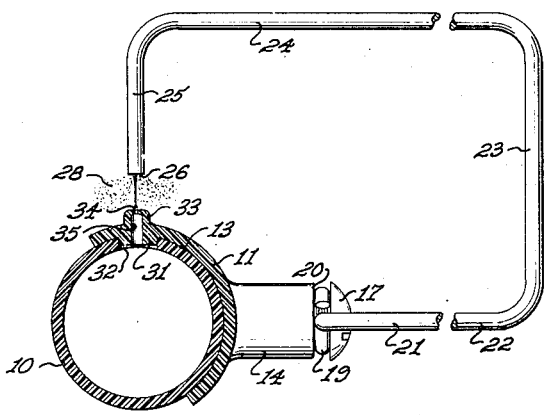
WILLIAM M. KRAMER
INVENTOR.

2,804,342

FOGGING DEVICE

William M. Kramer, Chino, Calif.

Application August 22, 1956, Serial No. 605,534

15 Claims. (Cl. 299—121)

This invention relates generally to spray forming devices, and more particularly has to do with a jet fogging attachment rapidly connectible to plastic pipe at any desired location of the jet so that the pipe may be easily and quickly converted to use for spraying purposes after the pipe is installed in position near the objects to be sprayed.

For maintaining such items as plants, poultry and vegetables in a continuously moist condition, the practice has been to create a water spray in the moisture zone, as by installing metal pipe to which various types of metal spray nozzles are attached as for example by drilling and tapping the pipe. However, metal pipe and nozzles are subject to rather rapid corrosion with subsequent clogging of the nozzles, which are not readily and easily cleaned after installation. Furthermore, such equipment is expensive and its installation is time consuming, especially the operation of installing the nozzles on the pipe.

For the solution of the above problems and to secure a reliable and efficient continuous spray or fog, the present invention contemplates the provision of a spray or fogging attachment for plastic pipe, which may be quickly and easily connected to the installed pipe, and which is not subject to corrosion and is rapidly and conveniently cleanable, so that the useful life of the pipe is greatly extended.

The jet fogging attachment for the plastic pipe comprises a molded plastic base of a material capable of being firmly bonded to the pipe, the base having a convex inner side portion sized for reception against the pipe exterior for bonding purposes.

A spring wire preferably composed of non-corrodible material such as brass is supported by the plastic base to extend outwardly and away from the base and then relatively inwardly toward the cylindrical outline of the pipe to terminate with the wire end directly facing the cylinder periphery and spaced therefrom for receiving impingement of water jetting outwardly from an opening formed in the pipe wall opposite the wire end. This opening may be very quickly formed in the pipe by merely manually rotating a small drill in contact with the pipe wall, after the fogging attachment base has been bonded to the pipe as by means of a suitable organic solvent, at such a location that the wire end is directly opposite the pipe wall opening. Thus, the construction of the attachment provides for its rapid and quick connection to plastic pipe at any location therealong and therearound as determined by the preferred hole location.

Another form of the invention makes the drilling of a small hole in the plastic pipe unnecessary, a relatively more easily and non-critically formed larger hole in the pipe serving to receive a projection carried by the plastic base, the latter itself containing a small jetting aperture registering with the larger pipe opening when the projection is received therein. In this form of the invention the base is located on the pipe by reception of the projection in the pipe opening, after which it is merely a matter of bonding the plastic base to the pipe in order to establish the connection, as will be brought out.

Other features and objects of the invention, as well as the details of an illustrative embodiment, will be more fully understood from the following detailed description of the drawings, in which:

Fig. 1 is a front elevation showing the attachment connected on the pipe;

Fig. 2 is a section taken on line 2—2 of Fig. 1;

Fig. 3 is a section taken on line 3—3 of Fig. 1;

Fig. 4 is a reduced rear elevation showing two fogging attachments connected on a run of pipe; and Fig. 5 is a section showing a modified form of the jet fogging attachment connected on the pipe.

In Figs. 1 through 4, the plastic pipe 10 typically has an inside diameter of between one-half and three-quarters of an inch, and preferably comprises polyvinyl chloride, which is not undesirably affected by prolonged exposure to sunlight. Bonded to the pipe, as by a suitable organic solvent such as cyclohexanone or mixtures of cyclohexanone with tetrahydrofuran, is the plastic base 11 of the jet fogging attachment generally indicated at 12. The base preferably comprises a plastic material of the same composition as the pipe, although any plastic materials capable of being bonded to the plastic pipe are within the broad contemplation of the invention.

As seen in Figs. 2 and 3, the molded plastic base 11 extends generally in a cylindrical plane arcing through an angle A considerably less than 360° and preferably between 90° and 180°, this cylindrical extent being desirable for secure bonding of the base to the pipe. For this purpose, the cylindrically convex inner side 13 of the base is sized for direct application against and surface-to-surface matching reception with the pipe exterior to be firmly bonded thereto.

Integrally formed on the base is a portion 14 raised outwardly from the plane of the base cylinder, the raised portion being in the form of a boss containing a radially extending through bore 15 receiving an internally threaded sleeve insert 16 preferably formed of a non-corrodible material such as brass and molded in the boss when the base is initially formed.

Threaded into the insert is a screw 17, the head of which bears against and retains the end 19 of a wire looped about the screw in mounted position between the screwhead and the flat surface 20 of the boss, the wire loop being held against turning by tightening of the screw.

The wire itself extends for a short distance parallel to the pipe axis at 21 and then turns into a plane extending generally normal to the axis of the pipe. In this plane, the wire extends at 22, 23, 24 and 25 generally along the sides of a rectangle defining a large loop, which because of the spring characteristic of the wire, allows ready axial deflection of the wire end portion 25. The latter terminates at flat end face 26 spaced radially outwardly from the cylindrical periphery of the pipe and opposite a small radial opening 27 in the pipe through which liquid is adapted to jet under pressure against the wire end to be broken up into minute particles in the nature of a fog as shown at 28.

While the invention contemplates locating the small hole 27 at any point about the pipe periphery, it is desirably formed in the top portion of the horizontally installed pipe illustrated in the drawing in order to prevent undesirable dripping of liquid during periods when the spraying or fogging attachment is not in use. Therefore, in connecting the attachment to the pipe, the plastic base is preferably bonded to the side of the horizontally extending pipe as shown in Figs. 2 and 3 so that the stretch 25 of the wire extends vertically downwardly toward the top of the pipe. Thereafter, the spring wire may be deflected as described above so that the hole 27 may be drilled into the top of the pipe directly beneath the normal position of the wire end face 26. Forming the hole in the top of the pipe also prevents clogging inasmuch as solid materials carried in the liquid within the pipe tend to drop downwardly therein. For purposes of producing water fog, it has been found that the hole and wire diameters should be approximately .0145 and .064 inch respectively, with a gap therebetween no greater than approximately 1/8 inch. Thus, the hole may be formed with a No. 79 drill and the wire may be of 14 gage size and made of brass. A slightly larger hole may be drilled if more spray is desired.

In Fig. 4, a number of fog producing attachments 30 are shown connected at intervals along a horizontal run of pipe 10, respective spacing between the attachments being in the four foot range for maximum fog producing and distributing efficiency. The pipe may be conveniently connected with a standard water distribution system wherein the water pressure is maintained around 40 p. s. i.

In Fig. 5, the attachment is modified slightly as shown with the base 11 including a projection or boss 31 at its inner convex side 13 and sized for reception within a relatively large hole 32 easily drilled into the plastic pipe 10. For example, the hole and boss may be nominally 1/8 inch in diameter so that a standard readily available drill may be used in cutting the opening in the pipe. The base also includes an external boss 33 opposite the internal boss 31 containing a small opening 34 sized for jetting the liquid against the wire 26 and suitably spaced therefrom. The jet aperture communicates with the pipe interior through a bore 35 formed by the two bosses 31 and 33 and the base 11.

In connecting the modified attachments to a pipe, openings 32 are first drilled at spaced intervals along the top of the pipe, and the attachment bases 11 are then bonded to the pipe after being conveniently located therealong by merely inserting the bosses 31 into the pipe openings. It is apparent that in this form the invention provides for maximum ease of attachment assembly on the pipe for converting the latter to use in producing fine spray or fog.

I claim:

1. A jet fogging attachment rapidly connectible to plastic pipe, comprising a molded plastic base having a side shaped to form a portion of the space occupied by the pipe when the base is fitted thereagainst to be firmly areally permanently bonded thereto and said base having a pair of terminal end portions at chordwise opposite sides of said space and adjacent thereto, and an openly exposed lightweight metallic spring wire detachably connected with said base extending away from the base and returning toward said space in a plane offset from the center of said detachable connection to terminate outside said space with the wire end facing the space periphery for receiving impingement of liquid jetting outwardly from a through opening formed in the pipe wall opposite the wire end, the return portion of said wire being manually deflectible with respect to said base to carry said wire end out of opposed relation with said opening.

2. A jet fogging attachment rapidly connectible to cylindrical plastic pipe, comprising a molded plastic base having a convex inner side shaped to form a portion of the space all of which is occupied by the pipe when the base is fitted thereagainst to be firmly areally permanently bonded thereto and said base having a pair of terminal end portions at chordwise opposite sides of said space and adjacent thereto, and an openly exposed lightweight metallic spring wire detachably connected with said base extending away from the base and returning toward said space in a plane offset from the center of said detachable connection to terminate outside said space with the wire end facing the space periphery for receiving impingement of liquid jetting outwardly from a through opening formed in the pipe wall opposite the wire end, the return portion of said wire being manually deflectible with respect to said base to carry said wire end out of opposed relation with said opening.

3. A jet fogging attachment rapidly connectible to cylindrical plastic pipe, comprising a molded plastic base having a cylindrically convex inner side portion extending in an arc substantially less than 360° and sized for direct application against and surface-to-surface matching reception with the pipe exterior to be firmly areally permanently bonded thereto and said base having a pair of terminal end portions at chordwise opposite sides of said space and adjacent thereto, and an openly exposed lightweight metallic spring wire detachably connected with said base extending outwardly away from the base and returning relatively inwardly toward the cylinder axis in a plane offset from the center of said detachable connection to terminate with the wire end facing toward the cylinder periphery in outwardly spaced relation therefrom for receiving impingement of liquid jetting outwardly from a through opening formed in the pipe wall opposite the wire end, the return portion of said wire being manually deflectible with respect to said base to carry said wire end out of opposed relation with said opening.

4. A jet fogging attachment rapidly connectible to cylindrical plastic pipe, comprising a molded plastic base extending in a cylindrical plane arcing through substantially less than 360° and having a cylindrically convex inner side portion sized for direct application against and surface-to-surface matching reception with the pipe exterior to be firmly areally permanently bonded thereto and said base having a pair of terminal end portions at chordwise opposite sides of said space and adjacent thereto, said base including a portion raised outwardly from said plane, and an openly exposed lightweight metallic spring wire detachably connected with said raised base portion extending outwardly from the base and returning relatively inwardly toward the cylinder axis in a plane offset from the center of said detachable connection to terminate with the wire end facing toward the cylinder periphery in outwardly spaced relation therefrom for receiving impingement of liquid jetting outwardly from a through opening formed in the pipe wall opposite the wire end, the return portion of said wire being manually deflectible with respect to said base to carry said wire end out of opposed relation with said opening.

5. The invention as defined in claim 4 including a screw holding the wire in seated engagement against said base raised portion.

6. The invention as defined in claim 5 comprising an internally threaded sleeve insert molded into said raised portion and receiving said screw with a portion of the wire looped about the screw removably held between the screw head and said raised base portion.

7. The invention as defined in claim 5 in which said wire end is flat and openly exposed to said cylinder periphery.

8. The invention as defined in claim 4 in which said wire extends from said raised base portion substantially parallel the cylinder axis and then in a plane substantially normal thereto so that manual deflection will not bodily displace the detachably connected portion of the wire with respect to said raised base portion.

9. The invention as defined in claim 8 in which the wire extends rectangularly in said plane.

10. The invention as defined in claim 4 in which said base contains a relatively small through aperture opposite said wire end for jetting said liquid from said pipe through opening in registration therewith.

11. The invention as defined in claim 10 in which said base has a projection at the inner side thereof sized for reception in a relatively large pipe wall opening to locate the base in relation to said opening and forming a portion of said aperture.

12. The combination comprising a plastic pipe containing a through opening in the pipe wall for jetting liquid outwardly from the pipe, a molded plastic base having a convex inner side portion received against the pipe exterior and firmly areally permanently bonded thereto and said base having a pair of terminal end portions at chordwise opposite sides of said pipe and adjacent thereto, and an openly exposed lightweight metallic spring wire detachably connected with said base extending outwardly away from the pipe and base and returning relatively inwardly toward the pipe in a plane offset from the center of said detachable connection to terminate with the wire end facing said through opening in outwardly spaced relation therefrom for receiving impingement of said jet and dispersing the jet as finely divided liquid particles, the return portion of said wire being manually deflectible with respect to said base to carry said wire end out of opposed relation with said opening.

13. The combination, comprising a cylindrical plastic pipe containing a plurality of through openings in the pipe wall extending in an axial radial plane for jetting liquid upwardly and outwardly from the pipe when the pipe is installed with said plane extending vertically, a plurality of molded plastic bases spaced along the pipe each having a convex inner side portion received against the pipe exterior and firmly areally permanently bonded thereto and said base having a pair of terminal end portions at chordwise opposite sides of said pipe and adjacent thereto, and a plurality of openly exposed lightweight metallic spring wires each detachably connected with one of said bases and extending outwardly away from the pipe and base and returning relatively inwardly toward the pipe in a plane offset from the center of said detachable connection to terminate, with the wire end facing one of said through openings in outwardly spaced relation therefrom for receiving impingement of a liquid jet and dispersing said jet as finely divided liquid particles, the return portion of said wire being manually deflectible with respect to said base to carry said wire end out of opposed relation with said opening.

14. The invention as defined in claim 13 in which said bases extend in cylindrical planes arcing through substantially less than 360°.

15. The invention as defined in claim 14 in which each of said bases contains a relatively small through aperture opposite said wire end and in registration with a relatively large pipe through opening.

References Cited in the file of this patent

UNITED STATES PATENTS

| | | |
|---|---|---|
| 572,606 | Jewell | Dec. 8, 1896 |
| 824,469 | Cline | June 26, 1906 |
| 2,540,663 | Garey | Feb. 6, 1951 |
| 2,699,310 | Evans | Jan. 11, 1955 |
| 2,706,134 | Wilson et al. | Apr. 12, 1955 |
| 2,721,764 | Wilson | Oct. 25, 1955 |

FOREIGN PATENTS

| | | |
|---|---|---|
| 675,269 | Great Britain | July 9, 1952 |